Figure 1:
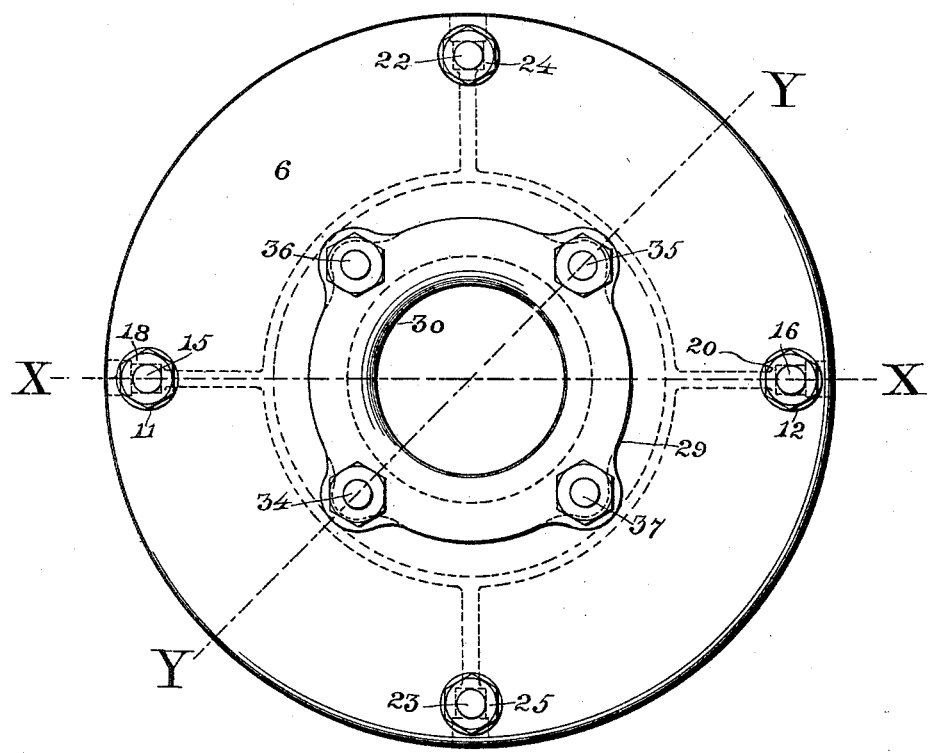

No. 706,298. Patented Aug. 5, 1902.
F. W. CARLSON.
SEWER PIPE CONNECTION.
(Application filed Mar. 21, 1902.)
(No Model.) 2 Sheets—Sheet 1.

WITNESSES:
William B. Thomas
S. Olina Moore

INVENTOR
Frank W. Carlson
BY
Edwin Guthrie
ATTORNEY

No. 706,298. Patented Aug. 5, 1902.
F. W. CARLSON.
SEWER PIPE CONNECTION.
(Application filed Mar. 21, 1902.)
(No Model.) 2 Sheets—Sheet 2.
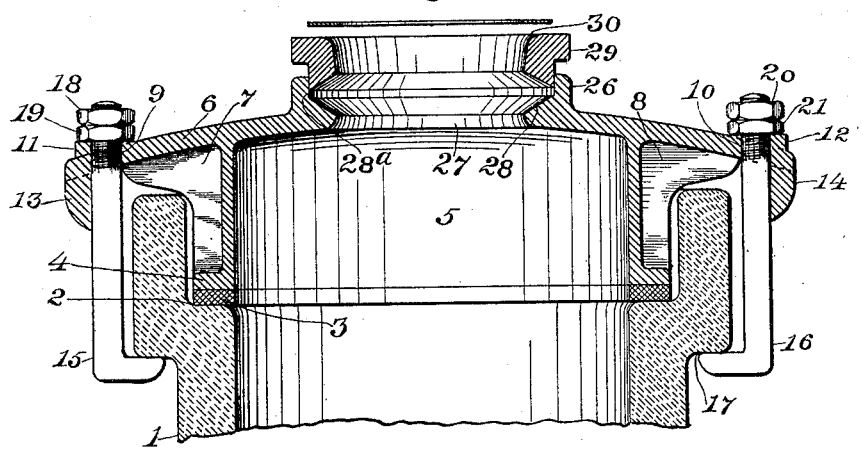
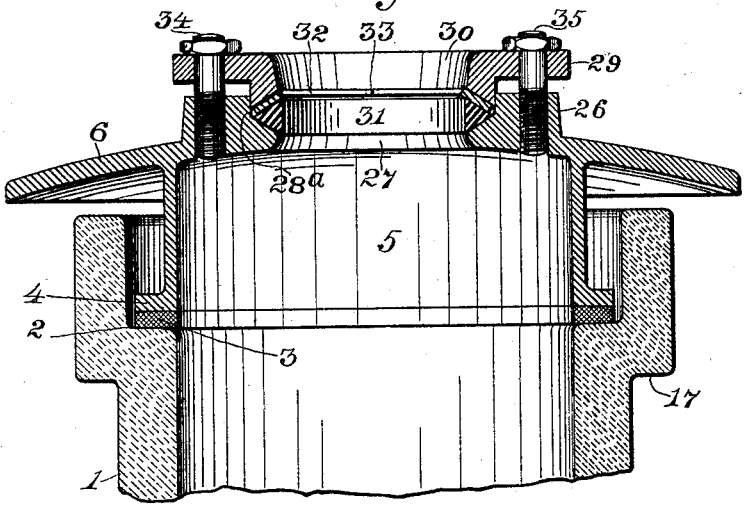
WITNESSES:
INVENTOR
Frank W. Carlson
BY
Edwin Guthrie
ATTORNEY

UNITED STATES PATENT OFFICE.

FRANK W. CARLSON, OF CHICAGO, ILLINOIS.

SEWER-PIPE CONNECTION.

SPECIFICATION forming part of Letters Patent No. 706,298, dated August 5, 1902.

Application filed March 21, 1902. Serial No. 99,283. (No model.)

*To all whom it may concern:*

Be it known that I, FRANK W. CARLSON, a citizen of the United States, residing at Chicago, in the county of Cook and State of Illinois, have invented certain new and useful Improvements in Sewer-Pipe Connections; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to sewer-pipe connections, and has for its general object the production of a device adapted particularly for making a gas and water tight junction between sewer and soil piping, or the invention may be employed as a hand-hole through which deposits within an angle or turn of a sewer-pipe may be cleaned out.

My invention has for its special object the construction of a connection of the nature stated that will comprise the fewest number of easily and cheaply manufactured parts designed with reference to the protection of the gaskets and packing in contact with the two pipes joined from water and dirt likely to reach them from the outside.

Each constituent element of my invention is described in detail and its individual office, together with the mode of operation of the whole, fully explained hereinbelow.

I accomplish the objects above set forth by employing the several parts and associating them one with another, as illustrated in the accompanying drawings, of which—

Figure 1 represents a top plan view; Fig. 2, a vertical section on the line X X of the first figure, and Fig. 3 shows a sectional view of the invention cut upon the plane indicated by the line Y Y of the first figure.

Like numerals refer to like parts throughout.

Considering the drawings, numeral 1 marks an earthenware sewer-pipe, the end portion thereof being shown as having the internal annular shoulder 2. Immediately next the shoulder is the gasket 3, of any selected pattern, material, or form. Upon the gasket rests the base ring-flange 4 of the main connection or casting 5. As usually constructed, the overhanging exterior flange 6 of the main connection is turned slightly downwardly in the manner illustrated. Flange 6 thus projects all around over the head of the sewer-pipe and will effectually shed all water or dirt falling upon it, thereby protecting the gasket from external deteriorating foreign substances. At quadrantal points (see Figs. 1 and 2) wall-braces are formed on the outer wall of the main connection 5. Two of these braces or extensions are shown and are designated by numbers 7 and 8. Adjacent to the outermost points of the wall-braces bolt-holes 9 and 10 are bored through the flange 6, which is ordinarily thickened at such points and provided with nut-rests 11 and 12 and retaining-lugs 13 and 14, which prevent the L-bolts 15 and 16 from being forced outwardly when tightened. The bends of the L-bolts are passed beneath the external shoulder 17 of pipe 1, and it is believed to be clear that upon setting up the nuts 18 19 and 20 21 the main connection 5 will be securely coupled with pipe 1, the gasket 3 being at the same time compressed all around into a water and gas tight contact with both parts. The remaining L-bolts and nuts shown in Fig. 1 are referred to by numbers 22 23 and 24 25.

That portion of the main connection which may be regarded as its top is designated by number 26 and has a central opening, the downwardly and outwardly inclined edge of which opening is marked 27. The top 26 is relatively thicker than the overhanging flange 6, and the circular cavity therein, of which the inclined wall portion is referred to by number 28 and the vertical portion by number 28ª, constitutes the base of a stuffing-box, the complemental element or gland 29 being shown in all the figures. The interior surface 30 of gland 29 is inclined downwardly and inwardly, and its upper edge is rounded customarily, as illustrated. My purpose in thus inclining the surface 30 is to permit a soil-pipe to enter the openings even if the pipe be slightly inclined to the vertical, as occasionally happens.

The packing within the stuffing-box is designated by number 31, and to protect the packing I use a divided washer 32, which is not a continuous band, but is cut at the point 33 in order that it may be passed over the head or end rim of a pipe. The washer is slightly smaller in circular measure than the opening through the stuffing-box and encircles a pipe tightly. When the gland 29 is forced down by the four or more stud-bolts 34, 35, 36, and 37, the washer compresses the packing firmly about an entering-pipe, making a water and gas tight joint and at the same time protecting the packing 31 from injury due to external exposure.

Having thus described my invention, what I claim, and desire to secure by Letters Patent of the United States, is—

In a sewer-pipe connection for coupling two pipes of different diameters, the combination of the main connection adapted to enter the end of the larger pipe, the said main connection having a flange at its lower part, a ring of packing arranged between the said flange and the interior of the larger pipe, and L-bolts engaging the outside of the larger pipe and the main connection whereby the said packing may be pressed against the interior of the larger pipe, the said main connection having a downwardly-inclined overhanging portion projecting circularly over the open end of the larger pipe and adapted to protect the end from falling dirt or moisture, the said main connection having a central opening and an upwardly-extended central portion constituting the base of a stuffing-box, the complemental element 29 of the stuffing-box, a ring of packing within the box and bolts connecting the said element 29 and the upwardly-extended central portion of the main connection whereby the packing within the stuffing-box may be forced against a pipe of relatively smaller diameter passing through it, substantially as described.

In testimony whereof I affix my signature in presence of two witnesses.

FRANK W. CARLSON.

Witnesses:
JOHN ANDERSON,
C. P. FRYE.